US012428899B2

(12) United States Patent
Kojima et al.

(10) Patent No.: US 12,428,899 B2
(45) Date of Patent: Sep. 30, 2025

(54) INFORMATION PROCESSING APPARATUS, INFORMATION PROCESSING METHOD, AND INFORMATION PROCESSING PROGRAM

(71) Applicant: AISIN CORPORATION, Kariya (JP)

(72) Inventors: Shin-ichi Kojima, Nagakute (JP); Kosuke Tsukao, Kariya (JP)

(73) Assignee: AISIN CORPORATION, Kariya (JP)

( * ) Notice: Subject to any disclaimer, the term of this patent is extended or adjusted under 35 U.S.C. 154(b) by 218 days.

(21) Appl. No.: 18/462,472

(22) Filed: Sep. 7, 2023

(65) Prior Publication Data

US 2024/0093545 A1 Mar. 21, 2024

(30) Foreign Application Priority Data

Sep. 9, 2022 (JP) ................................ 2022-144183

(51) Int. Cl.
*E05F 15/73* (2015.01)

(52) U.S. Cl.
CPC ........ *E05F 15/73* (2015.01); *E05F 2015/767* (2015.01); *E05Y 2400/44* (2013.01); *E05Y 2400/446* (2024.05); *E05Y 2900/531* (2013.01)

(58) Field of Classification Search
CPC ................ E05F 15/73; E05F 2015/767; E05Y 2400/446; E05Y 2400/44; E05Y 2900/531
See application file for complete search history.

(56) References Cited

U.S. PATENT DOCUMENTS

2021/0293074 A1 9/2021 Morosawa et al.

FOREIGN PATENT DOCUMENTS

JP 2021-147856 A 9/2021

*Primary Examiner* — Mathew Franklin Gordon
(74) *Attorney, Agent, or Firm* — Oblon, McClelland, Maier &Neustadt, L.L.P.

(57) ABSTRACT

An information processing apparatus includes: an acquisition unit configured to acquire an image captured by an imaging unit provided in a hinge door of a vehicle and a door opening angle indicating an angle at which the hinge door is opened from a closed state when the image is captured; a correction unit configured to correct an error of the door opening angle acquired by the acquisition unit; and a specification unit configured to specify a three-dimensional position of an obstacle with respect to the vehicle using corresponding points of the obstacle present around the hinge door, which are determined based on a plurality of images captured by the imaging unit from a plurality of viewpoints with different door opening angles acquired by the acquisition unit, and the door opening angles corrected by the correction unit and associated with the respective plurality of images.

11 Claims, 7 Drawing Sheets

INFORMATION PROCESSING APPARATUS, INFORMATION PROCESSING METHOD, AND INFORMATION PROCESSING PROGRAM

CROSS REFERENCE TO RELATED APPLICATIONS

This application is based on and claims priority under 35 U.S.C. § 119 to Japanese Patent Application 2022-144183, filed on Sep. 9, 2022, the entire content of which is incorporated herein by reference.

TECHNICAL FIELD

This disclosure relates to an information processing apparatus, an information processing method, and an information processing program.

BACKGROUND DISCUSSION

JP 2021-147856A (Reference 1) discloses a technique in which when a user of a vehicle approaches a power hinge door, the power hinge door is opened by a power door control unit.

As described above, as a technique in the related art, there is a technique of automatically opening a hinge door of a vehicle without a manual operation.

Here, when automatically opening the hinge door in a situation where an obstacle such as a wall or another vehicle is present around the vehicle, the hinge door must be opened to the extent that it does not come into contact with the obstacle. In order to open the hinge door to the extent that it does not come into contact with the obstacle, it is necessary to accurately specify a three-dimensional position of the obstacle with respect to the vehicle, and there is still room for improvement in a method of specifying a three-dimensional position of an obstacle.

A need thus exists for an information processing apparatus, an information processing method, and an information processing program which are not susceptible to the drawback mentioned above.

SUMMARY

An information processing apparatus according to an aspect of this disclosure includes: an acquisition unit configured to acquire an image captured by an imaging unit provided in a hinge door of a vehicle and a door opening angle indicating an angle at which the hinge door is opened from a closed state when the image is captured; a correction unit configured to correct an error of the door opening angle acquired by the acquisition unit; and a specification unit configured to specify a three-dimensional position of an obstacle with respect to the vehicle using corresponding points of the obstacle present around the hinge door, which are determined based on a plurality of images captured by the imaging unit from a plurality of viewpoints with different door opening angles acquired by the acquisition unit, and the door opening angles corrected by the correction unit and associated with the respective plurality of images.

An information processing method according to another aspect of this disclosure is executed by a computer, and the information processing method includes: acquiring an image captured by an imaging unit provided in a hinge door of a vehicle and a door opening angle indicating an angle at which the hinge door is opened from a closed state when the image is captured; correcting an error of the acquired door opening angle; and specifying a three-dimensional position of an obstacle with respect to the vehicle using corresponding points of the obstacle present around the hinge door, which are determined based on a plurality of images captured by the imaging unit from a plurality of viewpoints with different acquired door opening angles, and the corrected door opening angles associated with the respective plurality of images.

An information processing program according to still another aspect of this disclosure causes a computer to execute: acquiring an image captured by an imaging unit provided in a hinge door of a vehicle and a door opening angle indicating an angle at which the hinge door is opened from a closed state when the image is captured; correcting an error of the acquired door opening angle; and specifying a three-dimensional position of an obstacle with respect to the vehicle using corresponding points of the obstacle present around the hinge door, which are determined based on a plurality of images captured by the imaging unit from a plurality of viewpoints with different acquired door opening angles, and the corrected door opening angles associated with the respective plurality of images.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a vehicle 20 according to the present embodiment will be described.

First Embodiment

Figure 1:
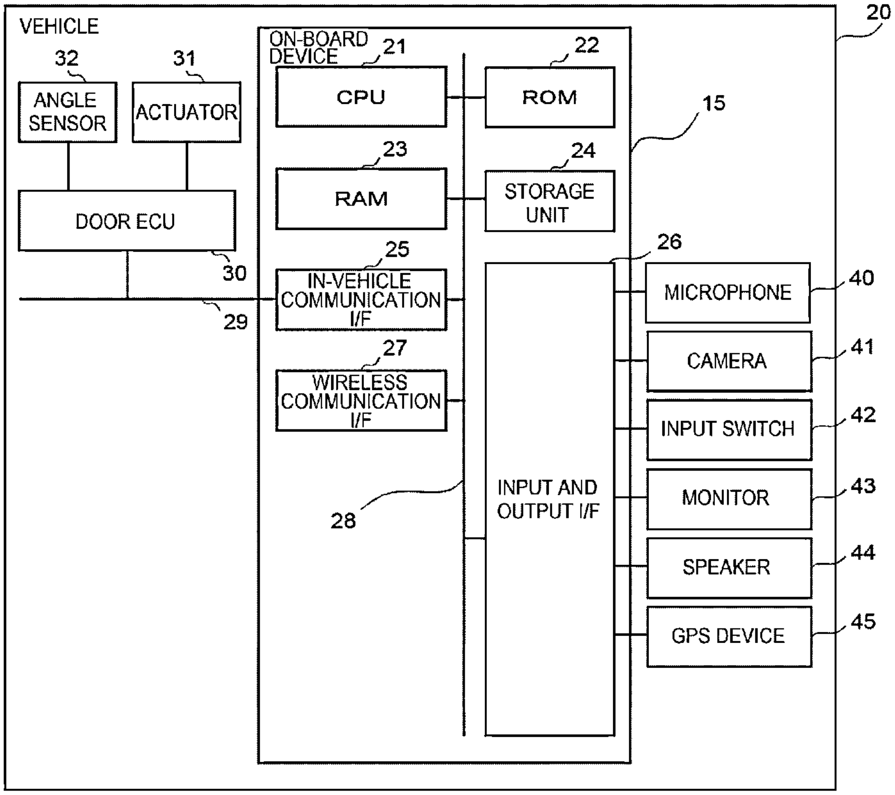
FIG. 1 is a first block diagram showing a hardware configuration of a vehicle.

FIG. 1 is a first block diagram showing a hardware configuration of the vehicle 20. The vehicle 20 may be any of a gasoline vehicle, a hybrid vehicle, and an electric vehicle. In the first embodiment, as an example, the vehicle 20 is a gasoline vehicle. The vehicle 20 includes a driver seat door on a driver seat side, a passenger seat door on a passenger seat side, and a rear door at the rear of the vehicle 20. In the first embodiment, the driver seat door of the vehicle 20 is a hinge door with a known rotation axis in vehicle body coordinates. The driver seat door is an example of a "hinge door".

As shown in FIG. 1, the vehicle 20 includes an on-board device 15, a door electronic control unit (ECU) 30, an actuator 31, an angle sensor 32, a microphone 40, a camera 41, an input switch 42, a monitor 43, a speaker 44, and a GPS device 45. The on-board device 15 is an example of an "information processing apparatus".

The on-board device 15 includes a central processing unit (CPU) 21, a read only memory (ROM) 22, a random access memory (RAM) 23, a storage unit 24, an in-vehicle communication interface (I/F) 25, an input and output I/F 26, and a wireless communication I/F 27. The CPU 21, the ROM 22, the RAM 23, the storage unit 24, the in-vehicle communication I/F 25, the input and output I/F 26, and the wireless communication I/F 27 are communicably connected to each other via an internal bus 28.

The CPU 21 is a central processing unit that executes various programs and controls each unit. That is, the CPU 21 reads a program from the ROM 22 or the storage unit 24, and executes the program using the RAM 23 as a work area. The CPU 21 controls the above-described components and performs various arithmetic processing in accordance with the program recorded in the ROM 22 or the storage unit 24.

The ROM 22 stores various programs and various types of data. The RAM 23 temporarily stores the program or data as the work area.

The storage unit 24 includes a storage device such as a hard disk drive (HDD), a solid state drive (SSD), or a flash memory, and stores various programs and various types of data. The storage unit 24 stores an information processing program for executing at least an opening processing to be described later.

The in-vehicle communication I/F 25 is an interface for connecting with the door ECU 30. A communication standard according to the CAN protocol is used for the interface. The in-vehicle communication I/F 25 is connected to an external bus 29.

In the first embodiment, the door ECU 30 is provided as an ECU. Although not shown, a plurality of ECUs are provided for each function of the vehicle 20 and include ECUs other than the door ECU 30.

The actuator 31 and the angle sensor 32 are connected to the door ECU 30.

The actuator 31 automatically opens and closes at least a driver seat door among the doors of the vehicle 20. In the first embodiment, the door ECU 30 causes the actuator 31 to be driven based on the control of the on-board device 15, so that the driver seat door can be automatically opened and closed without an occupant opening and closing the driver seat door.

The angle sensor 32 is provided at least on the driver seat door among the doors of the vehicle 20, and is a sensor for detecting a door opening angle indicating an angle at which the driver seat door is opened from a closed state, that is, when the door is closed. The door opening angle detected by the angle sensor 32 is stored in the storage unit 24.

The input and output I/F 26 is an interface for communicating with the microphone 40, the camera 41, the input switch 42, the monitor 43, the speaker 44, and the GPS device 45 mounted on the vehicle 20.

The microphone 40 is provided on a front pillar, a dashboard, or the like of the vehicle 20, and is a device that collects a sound uttered by a user of the vehicle 20.

As an example, the camera 41 includes a solid-state imaging device such as a charge coupled device (CCD) image sensor and a complementary metal oxide semiconductor (CMOS) image sensor. As an example, the camera 41 is provided at least on a door mirror 33 (see FIGS. 4 and 5) of the driver seat door of the vehicle 20, and captures an image of the side of the vehicle. The image captured by the camera 41 is stored in the storage unit 24 in association with the door opening angle when each image is captured. The camera 41 may be connected to the on-board device 15 via an ECU (for example, a camera ECU). The camera 41 is an example of an "imaging unit".

An orientation of the camera 41 in the vehicle body coordinates when the driver seat door is closed is known, and information on the orientation is stored in the storage unit 24.

The input switch 42 is provided on an instrument panel, a center console, a steering wheel, or the like, and is a switch to be operated by a driver finger to input an operation. As the input switch 42, for example, a push-button numeric keypad, a touch pad, or the like can be adopted. In the first embodiment, the input switch 42 is provided with at least one opening switch for opening the driver seat door. In the first embodiment, the driver seat door can be automatically opened by operating the opening switch in a state where the vehicle 20 is stopped or parked.

The monitor 43 is provided on an instrument panel, a meter panel, or the like, and is a liquid crystal monitor for displaying an operation proposal for a function of the vehicle 20 and an image for explaining the function. The monitor 43 may be provided as a touch panel that also serves as the input switch 42.

The speaker 44 is provided on an instrument panel, a center console, a front pillar, a dashboard, or the like, and is a device for outputting an operation proposal for a function of the vehicle 20 and a sound for explaining the function. The speaker 44 may be provided on the monitor 43.

The GPS device 45 is a device that measures a current position of the vehicle 20. The GPS device 45 includes an antenna (not shown) that receives signals from GPS satellites. The GPS device 45 may be connected to the on-board device 15 via a car navigation system connected to an ECU (for example, a multimedia ECU).

The wireless communication I/F 27 is a wireless communication module for communicating with other devices. The wireless communication module uses, for example, communication standards such as 5G, LTE, and Wi-Fi (registered trademark).

Next, the functional configuration of the on-board device 15 will be described.

Figure 2:
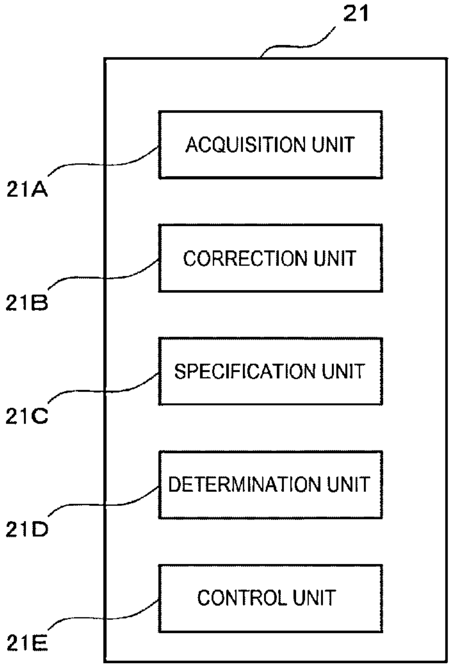
FIG. 2 is a first block diagram showing an example of a functional configuration of an on-board device.

FIG. 2 is a first block diagram showing an example of the functional configuration of the on-board device 15.

As shown in FIG. 2, the CPU 21 of the on-board device 15 includes, as the functional configuration, an acquisition unit 21A, a correction unit 21B, a specification unit 21C, a determination unit 21D, and a control unit 21E. Each functional configuration is implemented by the CPU 21 reading and executing an information processing program stored in the storage unit 24.

The acquisition unit 21A acquires an image captured by the camera 41 and a door opening angle when the image is captured. In the first embodiment, the acquisition unit 21A acquires a plurality of images captured by the camera 41 from a plurality of viewpoints with different door opening angles, and the door opening angles associated with the respective plurality of images.

The correction unit 21B corrects an error of the door opening angle acquired by the acquisition unit 21A. The door opening angle corrected by the correction unit 21B is stored in the storage unit 24. Here, the door opening angle detected by the angle sensor 32 may have an error due to a measurement error dependent on the angle sensor 32 (for example, a sensor mounting error or a sampling error), a measurement error dependent on the driver seat door (for example, an error due to door deflection), or the like. Therefore, in the first embodiment, it is assumed that there is an error in the door opening angle detected by the angle sensor 32, and the error is corrected by the correction unit 21B.

The specification unit 21C specifies a three-dimensional position of an obstacle with respect to the vehicle 20 using corresponding points of the obstacle present around the driver seat door, which are determined based on the plurality of images captured by the camera 41 from the plurality of viewpoints with different door opening angles acquired by the acquisition unit 21A, and the door opening angles corrected by the correction unit 21B and associated with the respective plurality of images. The corresponding points of the obstacle are determined by performing a known processing of extracting a feature point of an image on the plurality of images captured by the camera 41 from the plurality of viewpoints with different door opening angles. The specification unit 21C specifies the three-dimensional position of the obstacle by a multi-view stereo (MVS) method which is a technique of restoring a three-dimensional shape of an object using the plurality of images captured from different viewpoints.

The determination unit 21D determines a maximum door opening angle at which the driver seat door does not come into contact with the obstacle (hereinafter, referred to as a "maximum opening angle") using the three-dimensional position of the obstacle specified by the specification unit 21C and door information on a shape and a dimension of the driver seat door. The door information is stored in the storage unit 24 in advance.

The control unit 21E determines a door opening angle when the camera 41 captures an image, and performs control to open the driver seat door to the determined door opening angle. In the first embodiment, as an example, the acquisition unit 21A determines a first door opening angle to be "0 degrees" and a second door opening angle to be "7 degrees" when the camera 41 captures an image.

The control unit 21E performs control to open the driver seat door to the maximum opening angle determined by the determination unit 21D.

Figure 3:
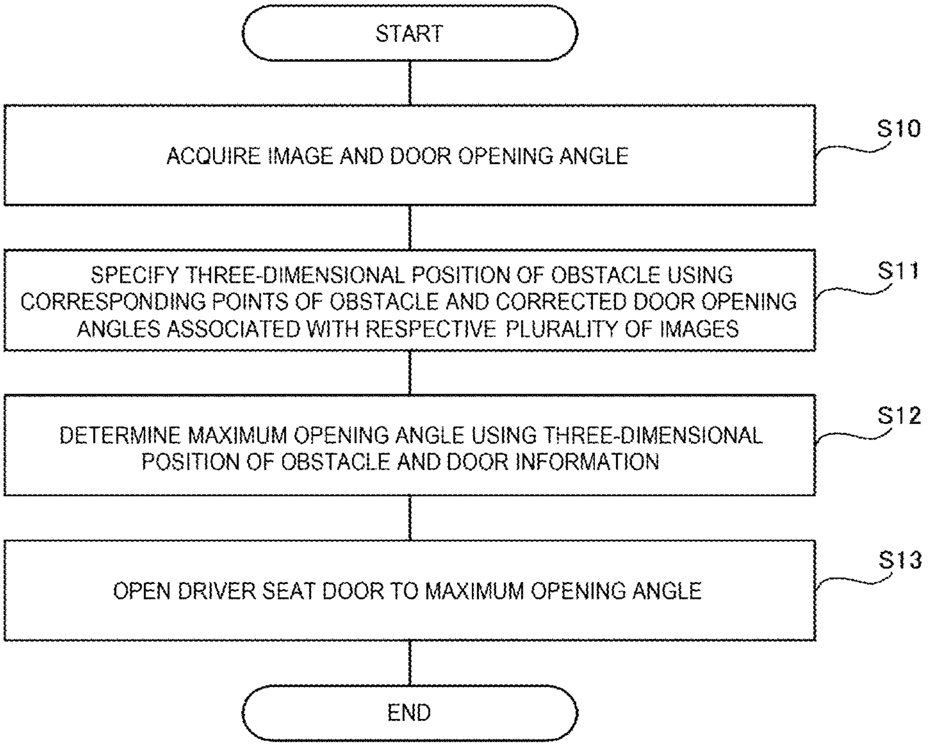
FIG. 3 is a first flowchart showing a flow of an opening processing.

FIG. 3 is a first flowchart showing a flow of an opening processing of determining a maximum opening angle and opening a driver seat door to the determined maximum opening angle. The CPU 21 reads the information processing program from the storage unit 24, loads the information processing program in the RAM 23, and executes the information processing program, thereby performing the opening processing. As an example, the opening processing is started when the opening switch is operated in a state where the vehicle 20 is stopped or parked.

In step S10 shown in FIG. 3, the CPU 21 acquires the image captured by the camera 41 and the door opening angle when the image is captured. As an example, the CPU 21 acquires an image captured by the camera 41 at the door opening angle of "0 degrees" and an image captured by the camera 41 at the door opening angle of "7 degrees". Then, the processing proceeds to step S11.

In step S11, the CPU 21 specifies the three-dimensional position of the obstacle with respect to the vehicle 20 using the corresponding points of the obstacle, which are determined based on the plurality of images captured by the camera 41 from the plurality of viewpoints with different door opening angles acquired in step S10, and the corrected door opening angles associated with the respective plurality of images. Here, the CPU 21 corrects the error of the door opening angle acquired in step S10. Then, the processing proceeds to step S12. The method of specifying the three-dimensional position of the obstacle, including the method of correcting the error of the door opening angle, will be described later.

In step S12, the CPU 21 determines the maximum opening angle using the three-dimensional position of the obstacle specified in step S11 and the door information on the driver seat door. Then, the processing proceeds to step S13. The method of determining the maximum opening angle will be described later.

In step S13, the CPU 21 opens the driver seat door to the maximum opening angle determined in step S12. Then, the opening processing ends.

Next, the method of specifying the three-dimensional position of the obstacle and the method of determining the maximum opening angle will be described with reference to FIGS. 4 and 5.

Figure 4:
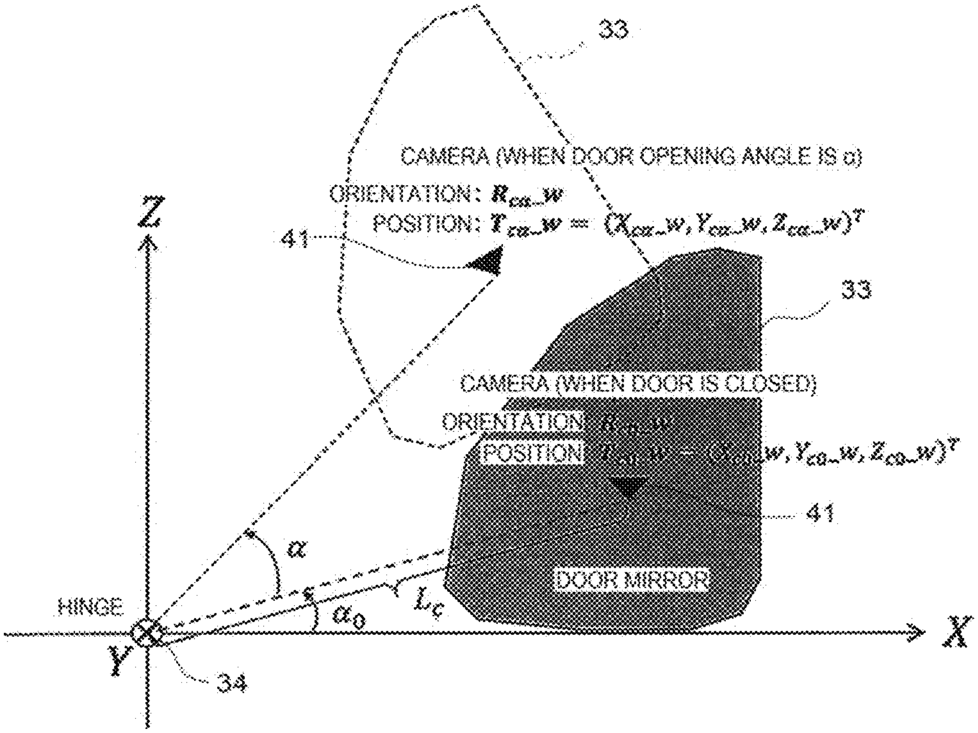
FIG. 4 is a first explanatory diagram showing a method of specifying a three-dimensional position of an obstacle and a method of determining a maximum opening angle.

FIG. 4 is a first explanatory diagram showing the method of specifying the three-dimensional position of the obstacle and the method of determining the maximum opening angle. FIG. 4 shows a reference coordinate system, and shows a state where the door mirror 33 of the driver seat door is viewed from above. In the first embodiment, the reference coordinate system is set such that a hinge 34, which is a rotation axis of the driver seat door, coincides with a Y axis. X indicates a direction toward the rear of the vehicle, Y indicates a direction toward the bottom of the vehicle, and Z indicates a direction toward the right of the vehicle. An origin is a point where the Y axis and the ground intersect.

As shown in FIG. 4, it is assumed that an initial position of the camera 41 in the reference coordinate system when the door is closed is $T_{c0}\_w=(X_{c0}\_w, Y_{c0}\_w, Z_{c0}\_w)^T$, a rotation radius of the camera 41 with respect to the hinge 34 is $L_c$, the door opening angle is $\alpha$, and a position of the camera 41 in the reference coordinate system when the door opening angle is $\alpha$ is $T_{c\alpha}\_w=(X_{c\alpha}\_w, Y_{c\alpha}\_w, Z_{c\alpha}\_w)^T$. T represents transposition. As shown in FIG. 4, it can be considered that the camera 41 at the initial position is rotated around the hinge 34 by $\alpha_0$. At this time, the CPU 21 calculates $L_c$ and $\alpha_0$ from $X_{c0}\_w$ and $Z_{c0}\_w$ using the following equations (1) and (2).

$$L_c = \sqrt{X_{c0}\_w^2 + Z_{c0}\_w^2} \tag{1}$$

$$\alpha_0 = \tan^{-1}\frac{Z_{c0}\_w}{X_{c0}\_w} \tag{2}$$

The CPU 21 calculates $(X_{c\alpha}\_w, Y_{c\alpha}\_w, Z_{c\alpha}\_w)$ using the following equation (3).

$$(X_{c\alpha}\_w, Y_{c\alpha}\_w, Z_{c\alpha}\_w)=(L_c \cos(\alpha_0+\alpha), Y_{c0}\_w, L_c \sin(\alpha_0+\alpha)) \tag{3}$$

As shown in FIG. 4, the orientations of the camera 41 when the door is closed and when the door opening angle is $\alpha$ are represented by rotation matrices in the reference coordinate system as $R_{c0}\_w$ and $R_{c\alpha}\_w$, respectively. Assuming that a rotation matrix representing a rotation of an angle $\theta$ around the Y axis is $R_Y\_w(\theta)$, a relationship between $R_{c0}\_w$ and $R_{c\alpha}\_w$ is expressed by the following equation (4).

$$R_{c\alpha}\_w=R_Y\_w(\alpha)R_{c0}\_w \tag{4}$$

As described above, the position and orientation of the camera 41 when the door opening angle is α can be determined using the door opening angle α and the position and orientation of the camera 41 when the door is closed.

Figure 5:
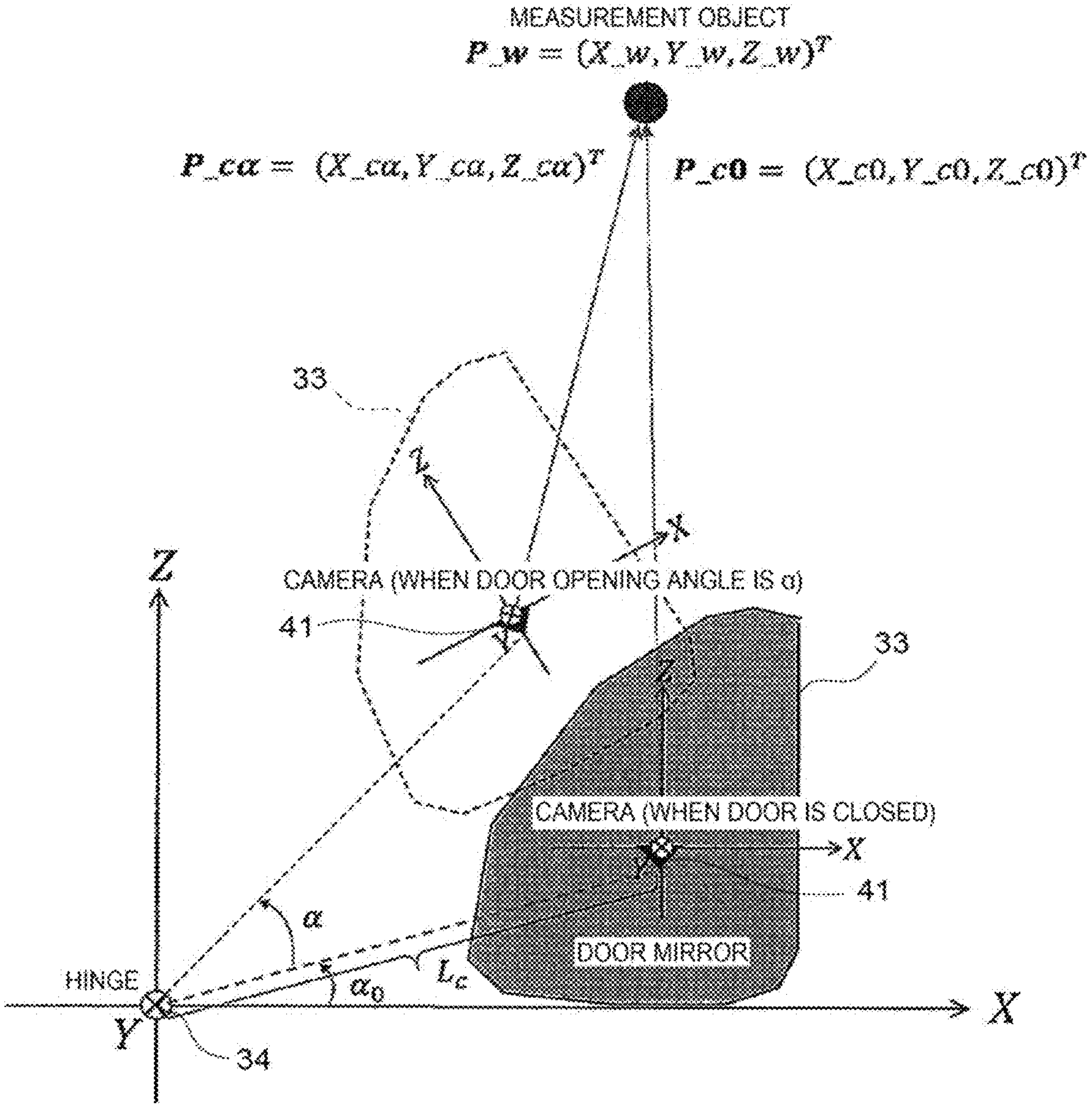
FIG. 5 is a second explanatory diagram showing the method of specifying the three-dimensional position of the obstacle and the method of determining the maximum opening angle.

Next, FIG. 5 shows a relationship between the camera coordinate system and the reference coordinate system and coordinates of the obstacle to be measured.

FIG. 5 is a second explanatory diagram showing the method of specifying the three-dimensional position of the obstacle and the method of determining the maximum opening angle.

As shown in FIG. 5, coordinates of the obstacle in the reference coordinate system corresponding to the corresponding points of the obstacle are $P\_w=(X\_w, Y\_w, Z\_w)^T$, coordinates of the obstacle in the camera coordinate system when the door is closed are $P\_c0=(X\_c0, Y\_c0, Z\_c0)^T$, and coordinates of the obstacle in the camera coordinate system when the door opening angle is α are $P\_c\alpha=(X\_c\alpha, Y\_c\alpha, Z\_c\alpha)^T$. It is assumed that image coordinates of the obstacle when the door is closed and when the door opening angle is α are $I\_i0=(x\_i0, y\_i0)^T$ and $I\_i\alpha=(x\_i\alpha, y\_i\alpha)^T$, respectively.

Here, P_w, P_c0, and P_cα represent the same target obstacle in different coordinate systems, and have relationships represented by the following equations (5) and (6).

$$P\_w=R_{c0}\_w\ P\_c0T_{c0}\_w \tag{5}$$

$$P\_w=R_{c\alpha}\_w\ P\_c\alpha+T_{c\alpha}\_w \tag{6}$$

It is assumed that a focal length and an image center in units of pixels, which are internal parameters of the camera 41, are f and $Ic\_i=(xc\_i, yc\_i)^T$, respectively. At this time, a projection equation of the image is the following equations (7) and (8).

$$I\_i0=(x\_i0, y\_i0)=\left(f\frac{X\_c0}{Z\_c0}+x_c\_i,\ f\frac{Y\_c0}{Z\_c0}+y_c\_i\right) \tag{7}$$

$$I\_i\alpha=(x\_i\alpha, y\_i\alpha)=\left(f\frac{X\_c\alpha}{Z\_c\alpha}+x_c\_i,\ f\frac{Y\_c\alpha}{Z\_c\alpha}+y_c\_i\right) \tag{8}$$

From the above equations (7) and (8), the following equations (9), (10), (11), and (12) are obtained.

$$X\_c0=\frac{1}{f}(x\_i0-x_c\_i)Z\_c0 \tag{9}$$

$$Y\_c0=\frac{1}{f}(y\_i0-y_c\_i)Z\_c0 \tag{10}$$

$$X\_c\alpha=\frac{1}{f}(x\_i\alpha-x_c\_i)Z\_c\alpha \tag{11}$$

$$Y\_c\alpha=\frac{1}{f}(y\_i\alpha-y_c\_i)Z\_c\alpha \tag{12}$$

By substituting the equations (9) and (10) into the above equation (5), the following equation (13) is obtained.

$$P\_w=R_{c0}\_w\begin{pmatrix}\frac{1}{f}(x\_i0-x_c\_i)\\ \frac{1}{f}(y\_i0-y_c\_i)\\ 1\end{pmatrix}Z\_c0+T_{c0}\_w \tag{13}$$

By substituting the equations (11) and (12) into the above equation (6), the following equation (14) is obtained.

$$P\_w=R_{c\alpha}\_w\begin{pmatrix}\frac{1}{f}(x\_i\alpha-x_c\_i)\\ \frac{1}{f}(y\_i\alpha-y_c\_i)\\ 1\end{pmatrix}Z\_c\alpha+T_{c\alpha}\_w \tag{14}$$

Here, in order to simplify the following equations, the constant terms in the above equations (13) and (14) are substituted as the following equations (15) and (16).

$$R_{c0}\_w\begin{pmatrix}\frac{1}{f}(x\_i0-x_c\_i)\\ \frac{1}{f}(y\_i0-y_c\_i)\\ 1\end{pmatrix}=A_0 \tag{15}$$

$$R_{c\alpha}\_w\begin{pmatrix}\frac{1}{f}(x\_i\alpha-x_c\_i)\\ \frac{1}{f}(y\_i\alpha-y_c\_i)\\ 1\end{pmatrix}=A_\alpha=\begin{pmatrix}A_x\\ A_y\\ A_z\end{pmatrix} \tag{16}$$

Here, assuming that an error of the door opening angle detected by the angle sensor 32 (hereinafter, also referred to as a "door angle error") is ε and ε is small, the rotation matrix is expressed by the following equation (17).

$$R_\varepsilon=\begin{pmatrix}\cos\varepsilon & 0 & \sin\varepsilon\\ 0 & 1 & 0\\ -\sin\varepsilon & 0 & \cos\varepsilon\end{pmatrix}\cong\begin{pmatrix}1 & 0 & \varepsilon\\ 0 & 1 & 0\\ -\varepsilon & 0 & 1\end{pmatrix}=I+\begin{pmatrix}0 & 0 & \varepsilon\\ 0 & 0 & 0\\ -\varepsilon & 0 & 0\end{pmatrix} \tag{17}$$

By giving a rotation matrix Rε of the door angle error, the following equations (18) and (19) are obtained.

$$P_w=A_0Z\_c0+T_{c0}\_w=R_\varepsilon A_\alpha Z\_c\alpha+T_{c\alpha}\_w \tag{18}$$

$$A_0Z\_c0-R_\varepsilon A_\alpha Z\_c\alpha=T_{c\alpha}\_w-T_{c0}\_w \tag{19}$$

By transforming the above equation (19), the following equation (20) is obtained.

$$(A_0\ \ -R_\varepsilon A_\alpha)\begin{pmatrix}Z\_c0\\ Z\_c\alpha\end{pmatrix}=\left(A_0\ \ -A_\alpha\ \ \begin{pmatrix}-A_z\\ 0\\ A_x\end{pmatrix}\right)\begin{pmatrix}Z\_c0\\ Z\_c\alpha\\ \varepsilon Z\_c\alpha\end{pmatrix}=T_{c\alpha}\_w-T_{c0}\_w \tag{20}$$

By solving the equation (20) with Z=εZ_cα, the following equation (21) is obtained.

$$\begin{pmatrix}Z\_c0\\ Z\_c\alpha\\ Z\end{pmatrix}=\left(A_0\ \ -A_\alpha\ \ \begin{pmatrix}-A_z\\ 0\\ A_x\end{pmatrix}\right)^{-1}(T_{c\alpha}\_w-T_{c0}\_w) \tag{21}$$

From Z=εZ_cα, the following equation (22) is obtained.

$$\varepsilon = \frac{Z}{Z\_c\alpha} \tag{22}$$

Here, when a value of ε is calculated at a plurality of corresponding points, there is a possibility that the value varies, but since ε is common in the same image pair, for example, the CPU 21 sets an average value of ε calculated at the plurality of corresponding points as $\bar{\varepsilon}$, configures $R_{\bar{\varepsilon}}$ using $\bar{\varepsilon}$, and corrects Aα by the following equation (23) to set Bα.

$$B_\alpha = R_{\bar{\varepsilon}} A_\alpha \tag{23}$$

The CPU 21 calculates Z_c0 and Z_cα using the following equation (24).

$$\begin{pmatrix} Z\_c0 \\ Z\_c\alpha \end{pmatrix} = \left( (A_0 \; -B_\alpha)^T (A_0 \; -B_\alpha) \right)^{-1} (A_0 \; -B_\alpha)^T (T_{c\alpha}\_w - T_{c0}\_w) \tag{24}$$

Here, X_c0 and Y_c0 are calculated by substituting a value of Z_c0 into the above equations (9) and (10), and P_w is calculated by substituting P_c0=(X_c0, Y_c0, Z_c0)$^T$ into the above equation (5). Similarly, P_w is calculated by substituting a value of Z_cα into the above equations (11) and (12) and further substituting into the above equation (6).

At this time, since P_w calculated from the above equation (5) and P_w calculated from the above equation (6) generally do not coincide with each other, in the first embodiment, the CPU 21 specifies a final solution, that is, the three-dimensional position of the obstacle with respect to the vehicle 20 by averaging the two P_w values. The disclosure is not limited thereto, the CPU 21 may adopt a predetermined one of the two P_w values or a weighted average of the two P_w values as the final solution.

Then, the CPU 21 specifies the three-dimensional position of the obstacle described above at a plurality of positions in the obstacle, and calculates the three-dimensional position of the obstacle at N positions.

Here, a door shape of the driver seat door is known, and the CPU 21 can calculate a radius $L_h$ of the driver seat door at a height $Y_h$ in the reference coordinate system. The CPU 21 performs the following calculations for all calculated three-dimensional points $P\_w_n=(X\_w_n, Y\_w_n, Z\_w_n)^T$, (n=0 to N−1) of the obstacle.

First, the CPU 21 obtains the radius $L_h$ of the driver seat door at the height $Y_h$ equal to the height $Y\_w_n$ of the obstacle. Then, when the radius L n of the driver seat door satisfies a relationship represented by the following equation (25), there is a possibility that the driver seat door comes into contact with the obstacle, so that the CPU 21 calculates an angle $\theta_n$ represented by the following equation (26).

$$L_h \leq \sqrt{X\_w_n^2 + Z\_w_n^2} \tag{25}$$

$$\theta_n = \tan^{-1}\frac{Z\_w_n}{X\_w_n} \tag{26}$$

On the other hand, when the radius Ln of the driver seat door satisfies a relationship represented by the following equation (27), the CPU 21 does not calculate the angle $\theta_n$. Then, the CPU 21 determines the smallest one of all the calculated angles $\theta_n$ as the maximum opening angle.

$$L_h > \sqrt{X\_w_n^2 + Z\_w_n^2} \tag{27}$$

As described above, in the first embodiment, the CPU 21 acquires the image captured by the camera 41 and the door opening angle when the image is captured. The CPU 21 corrects the error of the acquired door opening angle. Then, the CPU 21 specifies the three-dimensional position of the obstacle with respect to the vehicle 20 using the corresponding points of the obstacle, which are determined based on the plurality of images captured by the camera 41 from the plurality of viewpoints with the different acquired door opening angles, and the corrected door opening angles associated with the respective plurality of images. As described above, the door opening angle detected by the angle sensor 32 may have an error due to the measurement error dependent on the angle sensor 32 (for example, the sensor mounting error or the sampling error), the measurement error dependent on the driver seat door (for example, the error due to the door deflection), or the like. Therefore, in the first embodiment, assuming that there is an error in the door opening angle detected by the angle sensor 32, and by correcting the error, the three-dimensional position of the obstacle present around the vehicle 20, specifically, around the driver seat door can be specified with high accuracy.

Here, when specifying the three-dimensional position of the obstacle by a multi-view stereo method, it is necessary to calculate positions and orientations of the camera in respective images captured from the plurality of viewpoints. In the related art, accuracy of estimating the position and orientation of the camera is not sufficient because this calculation is difficult. In the related art, a large number of images are required because the accuracy of estimating the position and orientation of the camera is not sufficient. As a document of the multi-view stereo method, for example, there is "A Comparison and Evaluation of Multi-View Stereo Reconstruction Algorithms, CVPR 2006".

On the other hand, in the first embodiment, a movement of the camera 41 is restricted by having the hinge 34, which is a common rotation axis. Therefore, by using information indicating the coordinates of the hinge 34, the positions and orientations of the camera in the respective images captured from the plurality of viewpoints can be estimated with high accuracy. Therefore, according to the first embodiment, the three-dimensional position of the obstacle can be specified with fewer images than when specifying the three-dimensional position of the obstacle by the multi-view stereo method in the related art.

In the first embodiment, the three-dimensional position of the obstacle is specified using a door camera which is the camera 41 provided on the door mirror and the angle sensor 32, which are mounted on many vehicles. Therefore, there is no need to add a dedicated part for the specification.

In the first embodiment, the CPU 21 determines the maximum opening angle using the specified three-dimensional position of the obstacle and door information. Accordingly, according to the first embodiment, when opening the driver seat door in a situation where an obstacle is present around the vehicle 20, specifically, around the driver seat door, the driver seat door can be opened to the maximum extent that it does not come into contact with the obstacle.

In the first embodiment, the CPU 21 performs control to open the driver seat door to the determined maximum opening angle. Accordingly, according to the first embodiment, in a situation where an obstacle is present around the driver seat door, the driver seat door can be automatically opened to the maximum extent that it does not come into contact with the obstacle without the occupant performing the opening operation of the driver seat door.

In the first embodiment, the CPU 21 determines the door opening angle when the camera 41 captures an image, and performs control to open the driver seat door to the determined door opening angle. Accordingly, according to the first embodiment, in a situation where an obstacle is present around the driver seat door, the driver seat door can be automatically opened to the maximum extent that it does not come into contact with the obstacle without the occupant performing the opening operation of the driver seat door.

In the first embodiment, even while the CPU 21 is automatically opening the driver seat door, the occupant can manually open and close the driver seat door.

Second Embodiment

Next, a second embodiment will be described while omitting or simplifying overlapping portions with other embodiments.

Figure 6:
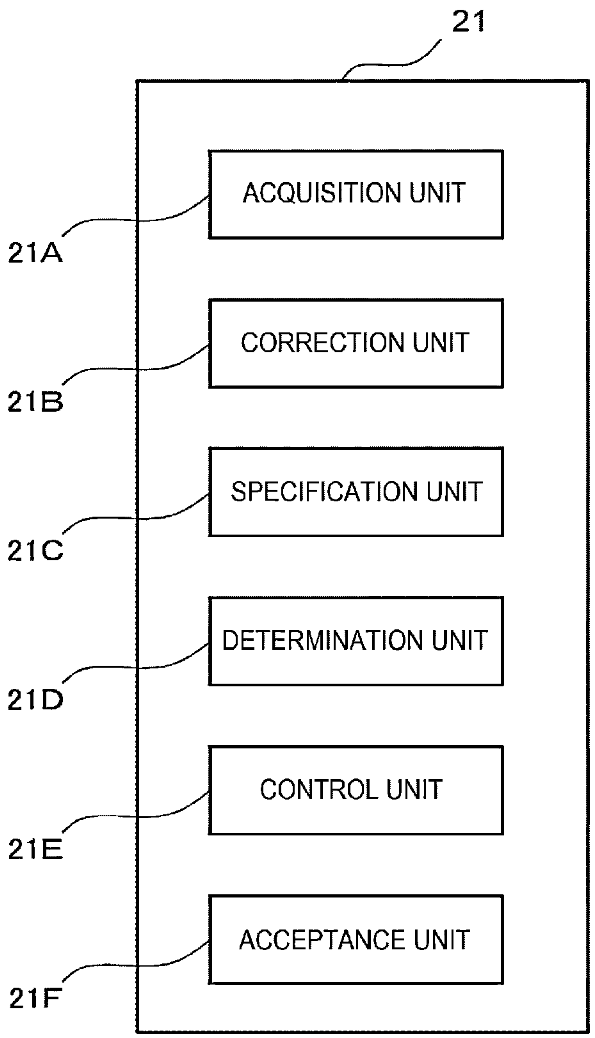
FIG. 6 is a second block diagram showing an example of a functional configuration of the on-board device.

FIG. 6 is a second block diagram showing an example of a functional configuration of the on-board device 15.

As shown in FIG. 6, the CPU 21 of the on-board device 15 includes, as the functional configuration, the acquisition unit 21A, the correction unit 21B, the specification unit 21C, the determination unit 21D, the control unit 21E, and an acceptance unit 21F. Each functional configuration is implemented by the CPU 21 reading and executing an information processing program stored in the storage unit 24.

In the second embodiment, after the determination unit 21D determines a maximum opening angle, the control unit 21E performs control to open a driver seat door to a predetermined angle at which an image is not captured by the camera 41 within a range of the maximum opening angle. At this time, the control unit 21E determines the predetermined angle according to the maximum opening angle determined by the determination unit 21D. As an example, the control unit 21E basically updates the predetermined angle in increments of 10 degrees, and when the maximum opening angle determined by the determination unit 21D is larger than a specific angle (for example, 70 degrees), the control unit 21E updates the predetermined angle in increments of 20 degrees.

In the second embodiment, the specification unit 21C specifies again the three-dimensional position of the obstacle with respect to the vehicle 20 using the corresponding points of the obstacle, which are determined based on a plurality of images captured by the camera 41 from a viewpoint of the predetermined angle and a viewpoint of another door opening angle, and the door opening angles corrected by the correction unit 21B and associated with the respective plurality of images. The "other door opening angle" may be a door opening angle of "0 degrees" or may be other than the door opening angle of "0 degrees", that is, a door opening angle of "1 degree" or more.

In the second embodiment, the determination unit 21D determines again the maximum opening angle using door information and the three-dimensional position of the obstacle specified again by the specification unit 21C.

The acceptance unit 21F accepts an input of the number of times the determination unit 21D determines the maximum opening angle (hereinafter, referred to as "the number of times of determination"). For example, the acceptance unit 21F accepts a value designated by an operation of the monitor 43 by an occupant as the number of times of determination.

Figure 7:
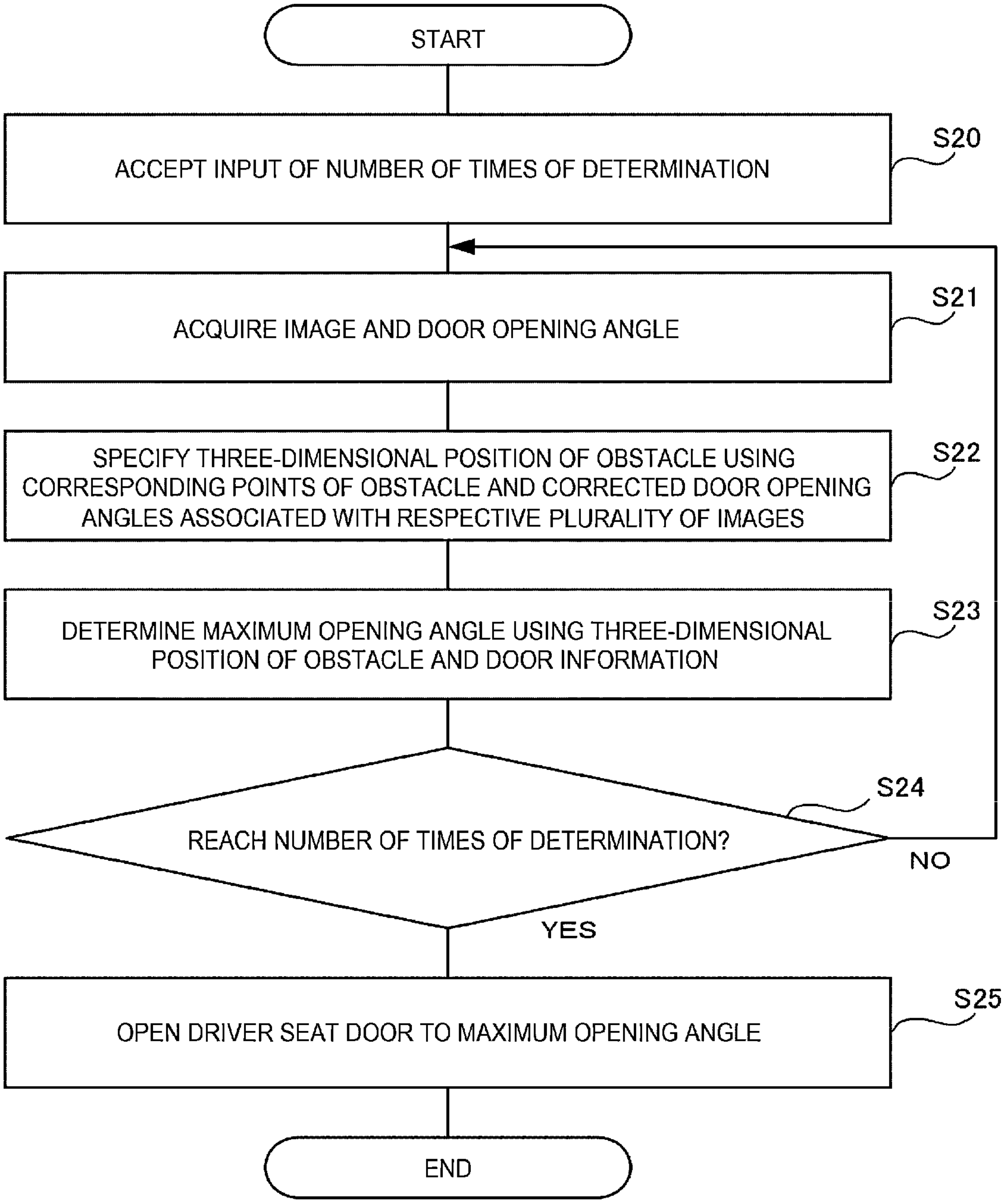
FIG. 7 is a second flowchart showing a flow of an opening processing.

FIG. 7 is a second flowchart showing a flow of the opening processing.

In step S20 shown in FIG. 7, the CPU 21 accepts an input of the number of times of determination. Then, the processing proceeds to step S21. As an example, it is assumed that the number of times the CPU 21 accepts the input is two.

In step S21, the CPU 21 acquires the image captured by the camera 41 and the door opening angle when the image is captured. As an example, in step S21 for a first time, the CPU 21 acquires the image captured by the camera 41 at the door opening angle of "0 degrees" and the image captured by the camera 41 at the door opening angle of "7 degrees". In step S21 for a second time, the CPU 21 acquires an image captured by the camera 41 at a door opening angle of "17 degrees" as the predetermined angle. Then, the processing proceeds to step S22.

In step S22, the CPU 21 specifies the three-dimensional position of the obstacle with respect to the vehicle 20 using the corresponding points of the obstacle, which are determined based on the plurality of images captured by the camera 41 from the plurality of viewpoints with different door opening angles acquired in step S21, and the corrected door opening angles associated with the respective plurality of images. Here, the CPU 21 corrects an error of the door opening angle acquired in step S21. As an example, in step S22 for a first time, the CPU 21 determines the corresponding points of the obstacle based on the images captured by the camera 41 from the viewpoint of the door opening angle of "0 degrees" and the viewpoint of the door opening angle of "7 degrees". In step S22 for a second time, the CPU 21 determines the corresponding points of the obstacle based on the images captured by the camera 41 from the viewpoint of the door opening angle of "17 degrees" and the viewpoint of the door opening angle of "0 degrees". Then, the processing proceeds to step S23.

In step S23, the CPU 21 determines the maximum opening angle using the three-dimensional position of the obstacle specified in step S22 and the door information on the driver seat door. Then, the processing proceeds to step S24.

In step S24, the CPU 21 determines whether the number of times the maximum opening angle is determined in step S23 reaches the number of times of determination for which the input is accepted in step S20. When the CPU 21 determines that the number of times the maximum opening angle is determined in step S23 reaches the number of times of determination (step S24: YES), the processing proceeds to step S25. On the other hand, when the CPU 21 does not determine that the number of times the maximum opening angle is determined in step S23 reaches the number of times of determination (step S24: NO), the processing returns to step S21.

In step S25, the CPU 21 opens the driver seat door to the maximum opening angle determined in previous step S23. Then, the opening processing ends.

As described above, in the second embodiment, after determining the maximum opening angle once, the CPU 21 performs control to open the driver seat door to the predetermined angle at which an image is not captured by the camera 41 within the range of the maximum opening angle. The CPU 21 specifies again the three-dimensional position of the obstacle with respect to the vehicle 20 using the corresponding points of the obstacle, which are determined based on the plurality of images captured by the camera 41 from the viewpoint of the predetermined angle and the viewpoint of the other door opening angle, and the corrected door opening angles associated with the respective plurality of images. Then, the CPU 21 determines again the maximum opening angle using the three-dimensional position of the obstacle specified again and the door information. Accordingly, according to the second embodiment, by determining the maximum opening angle again, the accuracy of the determined maximum opening angle can be improved compared to a configuration in which the maximum opening angle is determined only once.

In the second embodiment, the CPU 21 determines the predetermined angle according to the determined maximum opening angle. Here, when a distance to the obstacle is large (when the distance to the obstacle is greater than or equal to a predetermined distance), the three-dimensional position of the obstacle can be specified with higher accuracy by using an image with a large door opening angle rather than an image with a small door opening angle. Therefore, according to the second embodiment, as an example, when the determined maximum opening angle is larger than the specific angle, the predetermined angle is determined to be larger than a normal angle, so that the three-dimensional position of the obstacle can be specified with high accuracy.

In the second embodiment, the CPU 21 accepts the input of the number of times of determination. Accordingly, according to the second embodiment, for example, when the occupant has time to spare, by repeating the determination of the maximum opening angle many times, the maximum opening angle at which the drive seat door can be opened to just before the obstacle can be determined. According to the second embodiment, when the occupant does not have enough time, the driver seat door can be opened early by ending the determination of the maximum opening angle in a small number of repetitions.

Third Embodiment

Next, a third embodiment will be described while omitting or simplifying overlapping portions with other embodiments.

Figure 8:
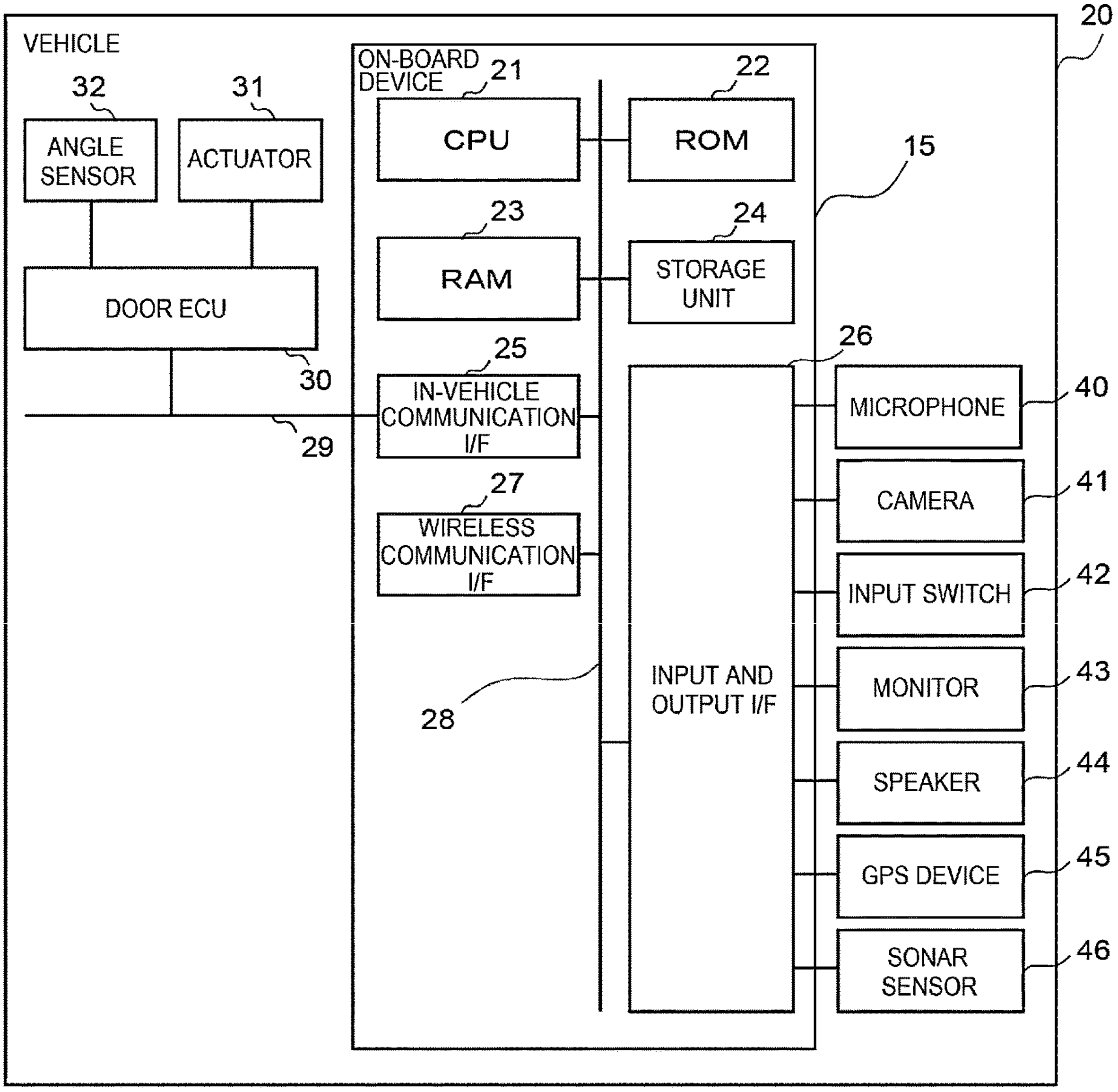
FIG. 8 is a second block diagram showing a hardware configuration of the vehicle.

FIG. 8 is a second block diagram showing a hardware configuration of the vehicle 20.

As shown in FIG. 8, in the third embodiment, the vehicle 20 includes the on-board device 15, the door ECU 30, the actuator 31, the angle sensor 32, the microphone 40, the camera 41, the input switch 42, the monitor 43, the speaker 44, the GPS device 45, and a sonar sensor 46.

The sonar sensor 46 is provided at least on the driver seat door, and is a device that uses ultrasonic waves to detect a distance to an obstacle approaching to the side of the vehicle. The sonar sensor 46 is an example of a "distance measurement sensor".

An example of a functional configuration of the on-board device 15 in the third embodiment is the same as the example of the functional configuration of the on-board device 15 in the second embodiment shown in FIG. 6.

In the third embodiment, the correction unit 21B corrects the image captured by the camera 41 using internal parameters of the camera 41. For example, the correction unit 21B performs distortion correction as correction of the image. At this time, the correction unit 21B uses, as the internal parameters of the camera 41, a parameter for correcting optical distortion for each camera model, a focal length, and the like. The internal parameters are stored in the storage unit 24 in advance.

As an example, the distortion correction by the correction unit 21B is performed using the following method. Scaramuzza, D., A. Martinelli, and R. Siegwart. "A Toolbox for Easy Calibrating Omnidirectional Cameras." Proceedings to IEEE International Conference on Intelligent Robots and Systems, (IROS). Oct. 7-15, 2006.

In the third embodiment, the control unit 21E performs control to prohibit opening of the driver seat door based on a detection result of the sonar sensor 46 provided on the driver seat door. Specifically, when the sonar sensor 46 detects an obstacle coming close to or approaching the driver seat door, the control unit 21E performs control to prohibit opening of the driver seat door.

Figure 9:
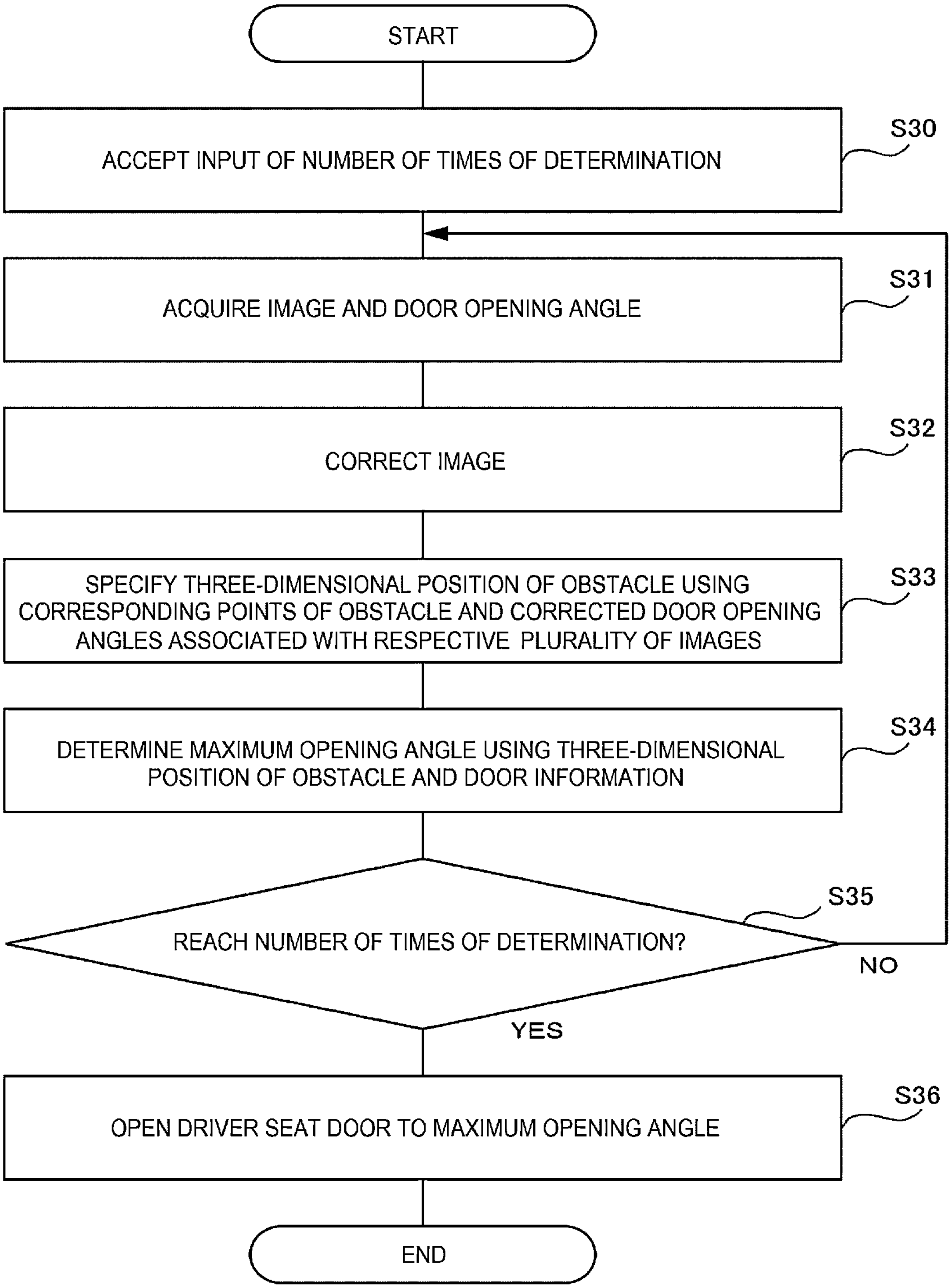
FIG. 9 is a third flowchart showing a flow of an opening processing.

FIG. 9 is a third flowchart showing a flow of an opening processing.

In step S30 shown in FIG. 9, the CPU 21 accepts an input of the number of times of determination. Then, the processing proceeds to step S31.

In step S31, the CPU 21 acquires the image captured by the camera 41 and the door opening angle when the image is captured. Then, the processing proceeds to step S32.

In step S32, the CPU 21 corrects the image acquired in step S31 using the internal parameters of the camera 41. Then, the processing proceeds to step S33.

In step S33, the CPU 21 specifies the three-dimensional position of the obstacle with respect to the vehicle 20 using the corresponding points of the obstacle, which are determined based on the plurality of images corrected in step S32, and the corrected door opening angles associated with the respective plurality of images. Here, the CPU 21 corrects the error of the door opening angle acquired in step S31. Then, the processing proceeds to step S34.

In step S34, the CPU 21 determines the maximum opening angle using the three-dimensional position of the obstacle specified in step S33 and the door information on the driver seat door. Then, the processing proceeds to step S35.

In step S35, the CPU 21 determines whether the number of times the maximum opening angle is determined in step S34 reaches the number of times of determination for which the input is accepted in step S30. When the CPU 21 determines that the number of times the maximum opening angle is determined in step S34 reaches the number of times of determination (step S35: YES), the processing proceeds to step S36. On the other hand, when the CPU 21 does not determine that the number of times the maximum opening angle is determined in step S34 reaches the number of determinations (step S35: NO), the processing returns to step S31.

In step S36, the CPU 21 opens the driver seat door to the maximum opening angle determined in previous step S34. Then, the opening processing ends.

As described above, in the third embodiment, the CPU 21 performs the control to prohibit the opening of the driver seat door based on the detection result of the sonar sensor 46 provided on the driver seat door. Accordingly, according to the third embodiment, as an example, opening of the driver seat door can be prohibited when the sonar sensor 46 detects the obstacle coming close to or approaching the driver seat door.

In the third embodiment, the CPU 21 corrects the image captured by the camera 41 using the internal parameters of the camera 41. Accordingly, according to the third embodiment, since the three-dimensional position of the obstacle is specified using the corrected image, the three-dimensional position of the obstacle can be specified with high accuracy compared to a configuration in which the image correction is not performed.

Others

In the above embodiment, the driver seat door of the vehicle 20 is an example of the "hinge door", but instead of or in addition to this, at least one of a front passenger seat door and a rear door may be an example of the "hinge door". When at least one of the front passenger seat door and the rear door is an example of the "hinge door", an actuator that automatically opens and closes the door, an angle sensor that detects a door opening angle of the door, and a camera that is provided in the door and captures an image of a side of the vehicle are mounted on the vehicle 20. When at least one of the front passenger seat door and the rear door is an example of the "hinge door", a sonar sensor may be provided on the door.

In the above embodiment, an example has been described in which the opening processing is started in a situation where an occupant is inside the vehicle 20, but the disclosure is not limited thereto, and the opening processing may be started in a situation where the occupant is outside the vehicle 20. As an example, the opening processing may be started when an electronic key corresponding to the vehicle 20 is detected in a situation where the occupant is outside the vehicle 20.

In the above embodiment, the camera 41 is provided on the door mirror 33 of the driver seat door of the vehicle 20, but the disclosure is not limited thereto, and the camera 41 may be provided in the driver seat door itself.

In the above embodiment, the obstacle present around the driver seat door may be an object imaged in the image captured by the camera 41, and may be an object present at a position in contact with the driver seat door when the driver seat door is opened, or may be an object present at a position not in contact with the driver seat door.

In the above embodiment, the on-board device 15 is an example of the "information processing apparatus", but the disclosure is not limited thereto, and an external device such as a server connectable to the vehicle 20 may be an example of the "information processing apparatus". In this case, as an example, the external device may include functions of the acquisition unit 21A, the correction unit 21B, the specification unit 21C, and the determination unit 21D described in the above embodiment, and the vehicle 20 may include functions of the control unit 21E and the acceptance unit 21F.

The opening processing executed by the CPU 21 reading software (program) in the above embodiment may be executed by various processors other than the CPU. In this case, examples of the processor include a programmable logic device (PLD) whose circuit configuration can be changed after manufacturing a field-programmable gate array (FPGA) or the like, a dedicated electric circuit such as an application specific integrated circuit (ASIC) that is a processor having a circuit configuration specially designed to execute specific processing, or the like. Further, the opening processing may be executed by one of these various processors, or may be executed by a combination of two or more processors of the same type or different types (for example, a combination of a plurality of FPGAs or a combination of a CPU and an FPGA). More specifically, a hardware structure of the various processors is an electric circuit in which circuit elements such as semiconductor elements are combined.

In the above embodiment, a mode has been described in which the information processing program is stored (installed) in advance in the storage unit 24, but the disclosure is not limited thereto. The information processing program may be provided in a form recorded in a recording medium such as a compact disk read only memory (CD-ROM), a digital versatile disk read only memory (DVD-ROM), and a universal serial bus (USB) memory. The information processing program may be downloaded from an external device via a network.

The present disclosure may adopt the following aspects.

(1) An information processing apparatus including:

an acquisition unit configured to acquire an image captured by an imaging unit provided in a hinge door of a vehicle and a door opening angle indicating an angle at which the hinge door is opened from a closed state when the image is captured;

a correction unit configured to correct an error of the door opening angle acquired by the acquisition unit; and a specification unit configured to specify a three-dimensional position of an obstacle with respect to the vehicle using corresponding points of the obstacle present around the hinge door, which are determined based on a plurality of images captured by the imaging unit from a plurality of viewpoints with different door opening angles acquired by the acquisition unit, and the door opening angles corrected by the correction unit and associated with the respective plurality of images.

(2) The information processing apparatus according to (1), further including:

a determination unit configured to determine a maximum door opening angle at which the hinge door does not come into contact with the obstacle using the three-dimensional position of the obstacle specified by the specification unit and door information on a shape and a dimension of the hinge door.

(3) The information processing apparatus according to (2), further including:

a control unit configured to perform control to open the hinge door to the maximum door opening angle, at which the hinge door does not come into contact with the obstacle, determined by the determination unit.

(4) The information processing apparatus according to (3), in which the control unit determines the door opening angle when the imaging unit captures the image, and performs control to open the hinge door to the determined door opening angle.

(5) The information processing apparatus according to (3) or (4), in which the control unit performs control to open the hinge door to a predetermined angle at which the image is not captured by the imaging unit within a range of the maximum door opening angle, at which the hinge door does not come into contact with the obstacle, after the determination unit determines the maximum door opening angle at which the hinge door does not come into contact with the obstacle, the specification unit specifies again the three-dimensional position of the obstacle with respect to the vehicle using corresponding points of the obstacle, which are determined based on a plurality of images captured by the imaging unit from a viewpoint of the predetermined angle and a viewpoint of another door opening angle, and the door opening angles corrected by the correction unit and associated with the respective plurality of images, and the determination unit determines again the maximum door opening angle, at which the hinge door does not come into contact with the obstacle, using the door information and the three-dimensional position of the obstacle specified again by the specification unit.

(6) The information processing apparatus according to (5), in which the control unit determines the predetermined angle according to the maximum door opening angle, at which the hinge door does not come into contact with the obstacle, determined by the determination unit.

(7) The information processing apparatus according to (5) or (6), further including:

an acceptance unit configured to accept an input of the number of times the maximum door opening angle at which the hinge door does not come into contact with the obstacle is determined by the determination unit.

(8) The information processing apparatus according to any one of (3) to (7), in which the control unit performs control to prohibit opening of the hinge door based on a detection result of a distance measurement sensor provided in the hinge door.

(9) The information processing apparatus according to any one of (1) to (8), in which the correction unit corrects the image captured by the imaging unit using an internal parameter of the imaging unit.

(10) An information processing method executed by a computer, the information processing method including:

acquiring an image captured by an imaging unit provided in a hinge door of a vehicle and a door opening angle indicating an angle at which the hinge door is opened from a closed state when the image is captured;

correcting an error of the acquired door opening angle; and specifying a three-dimensional position of an obstacle with respect to the vehicle using corresponding points of the obstacle present around the hinge door, which are determined based on a plurality of images captured by the imaging unit from a plurality of viewpoints with different acquired door opening angles, and the corrected door opening angles associated with the respective plurality of images.

(11) An information processing program for causing a computer to execute:

acquiring an image captured by an imaging unit provided in a hinge door of a vehicle and a door opening angle indicating an angle at which the hinge door is opened from a closed state when the image is captured;

correcting an error of the acquired door opening angle; and specifying a three-dimensional position of an obstacle with respect to the vehicle using corresponding points of the obstacle present around the hinge door, which are determined based on a plurality of images captured by the imaging unit from a plurality of viewpoints with different acquired door opening angles, and the corrected door opening angles associated with the respective plurality of images.

In the information processing apparatus, the information processing method, and the information processing program according to this disclosure, a three-dimensional position of an obstacle present around a vehicle can be accurately specified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An information processing apparatus comprising:

an acquisition unit configured to acquire an image captured by an imaging unit provided in a hinge door of a vehicle and a door opening angle indicating an angle at which the hinge door is opened from a closed state when the image is captured;

a correction unit configured to correct an error of the door opening angle acquired by the acquisition unit; and a specification unit configured to specify a three-dimensional position of an obstacle with respect to the vehicle using corresponding points of the obstacle present around the hinge door, which are determined based on a plurality of images captured by the imaging unit from a plurality of viewpoints with different door opening angles acquired by the acquisition unit, and the door opening angles corrected by the correction unit and associated with the respective plurality of images.

2. The information processing apparatus according to claim 1, further comprising:

a determination unit configured to determine a maximum door opening angle at which the hinge door does not come into contact with the obstacle using the three-dimensional position of the obstacle specified by the specification unit and door information on a shape and a dimension of the hinge door.

3. The information processing apparatus according to claim 2, further comprising:

a control unit configured to perform control to open the hinge door to the maximum door opening angle, at which the hinge door does not come into contact with the obstacle, determined by the determination unit.

4. The information processing apparatus according to claim 3, wherein the control unit determines the door opening angle when the imaging unit captures the image, and performs control to open the hinge door to the determined door opening angle.

5. The information processing apparatus according to claim 3, wherein the control unit performs control to open the hinge door to a predetermined angle at which the image is not captured by the imaging unit within a range of the maximum door opening angle, at which the hinge door does not come into contact with the obstacle, after the determination unit determines the maximum door opening angle at which the hinge door does not come into contact with the obstacle, the specification unit specifies again the three-dimensional position of the obstacle with respect to the vehicle using corresponding points of the obstacle, which are determined based on a plurality of images captured by the imaging unit from a viewpoint of the predetermined angle and a viewpoint of another door opening angle, and the door opening angles corrected by the correction unit and associated with the respective plurality of images, and the determination unit determines again the maximum door opening angle, at which the hinge door does not come into contact with the obstacle, using the door information and the three-dimensional position of the obstacle specified again by the specification unit.

6. The information processing apparatus according to claim 5, wherein the control unit determines the predetermined angle according to the maximum door opening angle, at which the hinge door does not come into contact with the obstacle, determined by the determination unit.

7. The information processing apparatus according to claim 5, further comprising:

an acceptance unit configured to accept an input of the number of times the maximum door opening angle at which the hinge door does not come into contact with the obstacle is determined by the determination unit.

8. The information processing apparatus according to claim 3, wherein the control unit performs control to prohibit opening of the hinge door based on a detection result of a distance measurement sensor provided in the hinge door.

9. The information processing apparatus according to claim 1, wherein the correction unit corrects the image captured by the imaging unit using an internal parameter of the imaging unit.

10. An information processing method executed by a computer, the information processing method comprising:

acquiring an image captured by an imaging unit provided in a hinge door of a vehicle and a door opening angle indicating an angle at which the hinge door is opened from a closed state when the image is captured;

correcting an error of the acquired door opening angle; and specifying a three-dimensional position of an obstacle with respect to the vehicle using corresponding points of the obstacle present around the hinge door, which are determined based on a plurality of images captured by the imaging unit from a plurality of viewpoints with different acquired door opening angles, and the corrected door opening angles associated with the respective plurality of images.

11. An information processing program for causing a computer to execute:

acquiring an image captured by an imaging unit provided in a hinge door of a vehicle and a door opening angle indicating an angle at which the hinge door is opened from a closed state when the image is captured;

correcting an error of the acquired door opening angle; and specifying a three-dimensional position of an obstacle with respect to the vehicle using corresponding points of the obstacle present around the hinge door, which are determined based on a plurality of images captured by the imaging unit from a plurality of viewpoints with different acquired door opening angles, and the corrected door opening angles associated with the respective plurality of images.

* * * * *